United States Patent [19]

Förster et al.

[11] Patent Number: 5,551,540
[45] Date of Patent: Sep. 3, 1996

[54] VIBRATION DAMPER AND A VIBRATION DAMPER WITH A VALVE ACTUATION DEVICE

[75] Inventors: Andreas Förster; Alfred Wirth, both of Schweinfurt, Germany

[73] Assignee: Fichtel & Sachs AG, Schweinfurt, Germany

[21] Appl. No.: 371,887

[22] Filed: Jan. 12, 1995

[30] Foreign Application Priority Data

Jan. 15, 1994 [DE] Germany ............... 44 01 065.6

[51] Int. Cl.⁶ ................... F16F 9/46; F16F 9/34
[52] U.S. Cl. ........................... 188/299; 280/707
[58] Field of Search ................... 188/280, 285, 188/299, 322.15; 280/707, 714; 137/614.2, 614.21; 251/129.15

[56] References Cited

U.S. PATENT DOCUMENTS 4,723,640  2/1988  Beck ................... 188/299
5,251,730  10/1993  Ackermann et al. ............ 188/299

FOREIGN PATENT DOCUMENTS 2111123  9/1972  Germany.
3-217311  9/1991  Japan ................... 188/299
5-060163  3/1993  Japan ................... 188/299
6-042572  2/1994  Japan ................... 188/299

Primary Examiner—Robert J. Oberleitner
Assistant Examiner—Chris Schwartz
Attorney, Agent, or Firm—Nils H. Ljungman and Associates

[57] ABSTRACT

A vibration damper is disclosed having a valve actuation device and a housing, in which housing the valve actuation device can be located. The valve actuation device has a controllable coil form, a coil core, and a movable armature for executing an actuation motion. At least a portion of the housing of the vibration damper can represent a magnetic return body for the magnetic flux generated by the coil form.

15 Claims, 10 Drawing Sheets

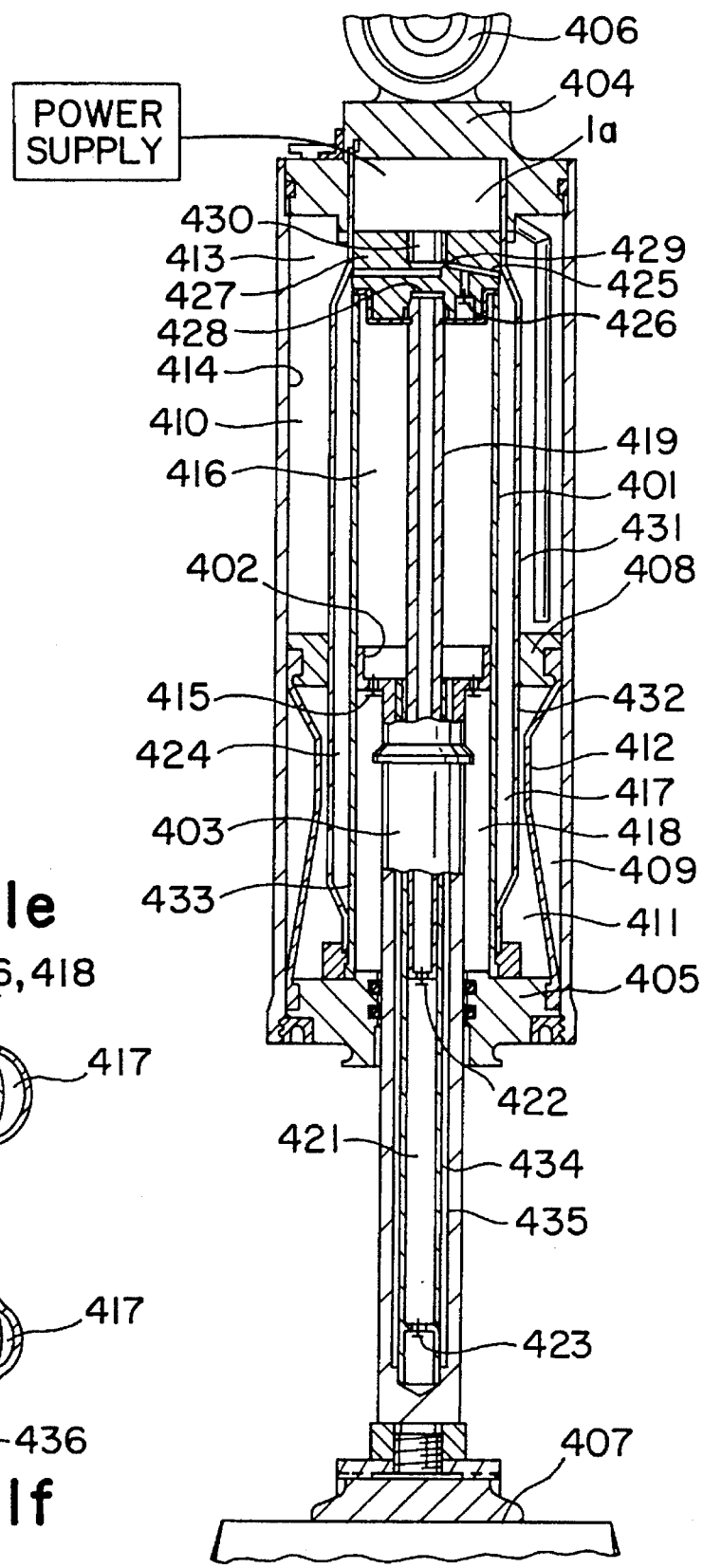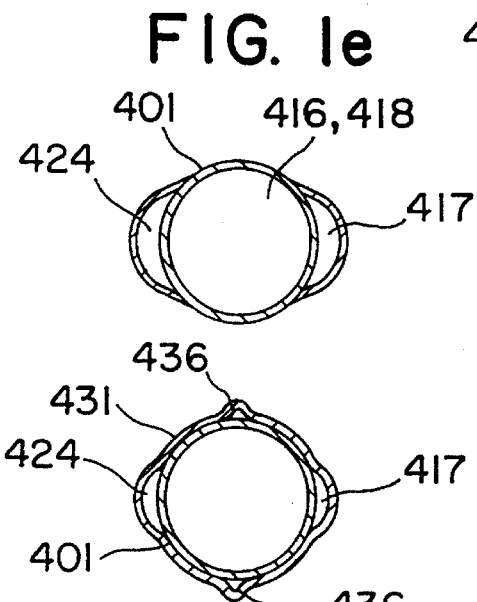
FIG. 1e
FIG. 1f
FIG. 1d

VIBRATION DAMPER AND A VIBRATION DAMPER WITH A VALVE ACTUATION DEVICE

BACKGROUND OF THE INVENTION

1. Field of the Invention

The present invention generally relates to a vibration damper having a valve actuation device. The valve actuation device can preferably have a housing, in which housing a coil form, a coil core, and an armature can be disposed.

2. Background Information

Similar valve actuation devices are used extensively for adjustable damping valves of vibration dampers, whereby such use is independent of whether the adjustable damping valve is located on the piston rod, or is located as a cutoff valve component outside the vibration damper. A perennial problem is the need to reduce the size of such damping valves. When the adjustable damping valves are mounted on the piston rod side of the piston, the valve actuation devices must not significantly reduce the length of the maximum stroke. The external damping valves are constantly running into space problems in the wheel housings. Therefore, essentially the only way to reduce costs is to simplify and/or reduce the number of the individual parts required.

OBJECT OF THE INVENTION

The object of the present invention is to solve the problems relating to space and cost, as described above.

SUMMARY OF THE INVENTION

The present invention teaches that this object can be accomplished when at least one segment of the housing represents a magnetic return body for the magnetic flux of a valve actuation device using magnets to control the actuation of the valve. In other words, and in accordance with one embodiment of the present invention, the housing, which can preferably serve as a magnetic return body, can be a part of an existing structure, such as a container tube of a vibration damper, a side tube of a vibration damper, a hollow piston rod of a vibration damper, or possibly the external housing of the valve.

As a result of this advantageous measure, it can become possible to make improved utilization of the space available, which space is always at a premium. By utilizing an existing housing part, which housing part will generally be a necessary part of the valve, there is essentially no need for a separate magnetic return body for the magnetic flux, thereby resulting in a reduced number of parts. The reduced number of parts can have a positive effect on the cost of manufacture.

The present invention also teaches that the guide for the armature can preferably be located outside the primary magnetic flux. As a result of this measure, the distance between the armature and the radially neighboring parts inside a magnetic return path of the magnetic flux can be kept small enough that a sticking or freezing effect of the movable valve components with respect to one another can Just barely be avoided, while still permitting sufficient magnetic flux to essentially still be guaranteed. The distance which can be realized is so small that a manageable insulator would occupy significantly more radial space. In one variant embodiment, inside the armature guide there can preferably be at least one part which is made of a material which preferably has a low magnetic conductivity. Alternatively, the armature can preferably have a segment which has a reduced cross section, and which segment divides the magnetic flux into a primary-flux and at least one secondary flux. Thus, sticking effects for the guide can preferably be avoided, since the guide can be located in the secondary flux.

As an additional advantageous measure, the present invention teaches that to reduce the amount of space required, the armature can preferably be oriented coaxially with respect to the coil form. So that the magnetic flux can be guided accurately, the coil form can preferably have a stepped contour. In accordance with this embodiment of the present invention, the armature can also have an axial overlap with the coil core, so that in the radial direction there can be an easy transition or crossover of the magnetic flux preferably from the coil core to the armature or vice versa. As an additional characteristic for the steering or control of the magnetic flux, the coil core can preferably have a recess in the direction of the armature. In other words, and in accordance with one embodiment of the present invention, the coil core can preferably have a recess which slopes or extends radially outwardly toward the armature. The recess is thereby clearly deeper than the length of the actuation movement of the armature.

In accordance with one preferred embodiment, the present invention can preferably have a coil form with a minimum length which is comprised of the length of the part of the armature in the primary magnetic flux and the armature travel. Consequently, the coil form can preferably act as an insulator between the armature and the housing, and can be used to direct the magnetic flux.

To reduce the magnetic forces required, the armature can preferably be at least partly pressure-equalized, for which purpose the armature can have a flow connection for a pressure equalization chamber. A sealing insert can preferably be located at an arbitrary point between the pressure equalization chamber and a cable connection for the coil form. The sealing insert prevents the penetration of oil in the vicinity of the cable connection. The manufacturing cost for the installation of the power cable and its seal, with respect to the hydraulic portion of the valve actuation device, can thereby be substantially reduced.

The coil core can advantageously have a cross section which is essentially T-shaped. By configuring the coil core in this manner, the coil core can preferably form a cover for the valve actuation device.

In accordance with one preferred embodiment of the present invention, a hollow piston rod of a vibration damper can comprise the housing segment which represents the magnetic return body.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the invention resides broadly in a vibration damper for damping vibrations of a suspension of a motor vehicle, the vibration damper comprising: a cylinder; damping fluid disposed within the cylinder; a piston rod projecting into the cylinder, the piston rod being movable axially within the cylinder; a piston disposed on the piston rod, the piston dividing the cylinder into a first chamber and a second chamber; means for providing fluid communication between the first chamber and the second chamber; and valve means for regulating flow of damping fluid through the means for providing fluid communication, the valve means comprising: a valve actuation device comprising a housing in which, by means of a controllable coil form, an armature executes an actuation movement, whereby the coil form has a coil core, wherein at least one segment of the housing represents a magnetic return body for the magnetic flux.

Another aspect of the invention resides broadly in a method of operating a vibration damper for damping vibrations of a suspension of a motor vehicle, the vibration damper comprising: a cylinder; damping fluid disposed within the cylinder; a piston rod projecting into the cylinder, the piston rod being movable axially within the cylinder; a piston disposed on the piston rod, the piston dividing the cylinder into a first chamber and a second chamber; means for providing fluid communication between the first chamber and the second chamber; and valve means for regulating flow of damping fluid through the means for providing fluid communication, the valve means comprising: a valve actuation device comprising a housing in which, by means of a controllable coil form, an armature executes an actuation movement, whereby the coil form has a coil core, wherein at least one segment of the housing represents a magnetic return body for the magnetic flux; the method comprising the steps of: providing a cylinder; providing damping fluid within the cylinder; providing a piston rod, the piston rod projecting into the cylinder; providing the piston rod with a piston, the piston dividing the cylinder into a first chamber and a second chamber; providing means for providing fluid communication between the first chamber and the second chamber; and providing valve means for regulating flow of damping fluid through the means for providing fluid communication; the step of providing the valve means further comprises: providing a valve actuation device; the step of providing the valve actuation device further comprises: providing a housing; providing a controllable coil form and a coil core; providing an armature; the method further comprising the steps of: moving the piston rod axially within the cylinder; providing fluid communication between the first chamber and the second chamber with the means for providing fluid communication; regulating flow of damping fluid through the means for providing fluid communication with the valve means; executing an actuation movement with the armature; and providing a magnetic return path through at least one segment of the housing.

BRIEF DESCRIPTION OF THE DRAWINGS

The present invention is explained in greater detail below with reference to the accompanying drawings, in which:

FIGS. 1d, 1e and 1f show a valve actuation device incorporated into an inner tube of a vibration damper;

DESCRIPTION OF THE PREFERRED EMBODIMENT

Figure 1:
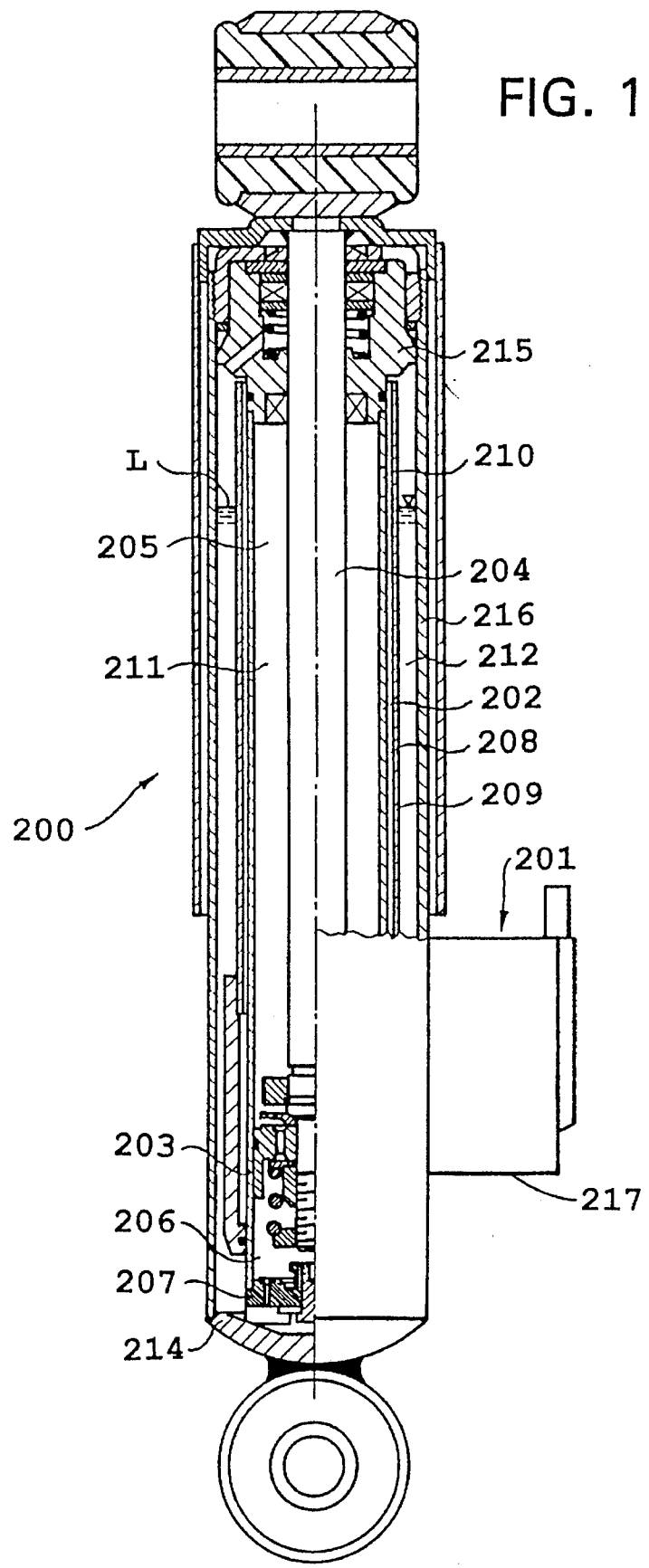
FIG. 1 shows a typical vibration damper.

FIG. 1 shows a complete shock absorber or oscillation damper 200, a detailed illustration of the valve unit 201 being omitted for the sake of clarity. The valve unit 201 can preferably be enclosed within a side tube 217, which side tube 217 can be welded to a container tube 216. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212, In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

Figure 1A:
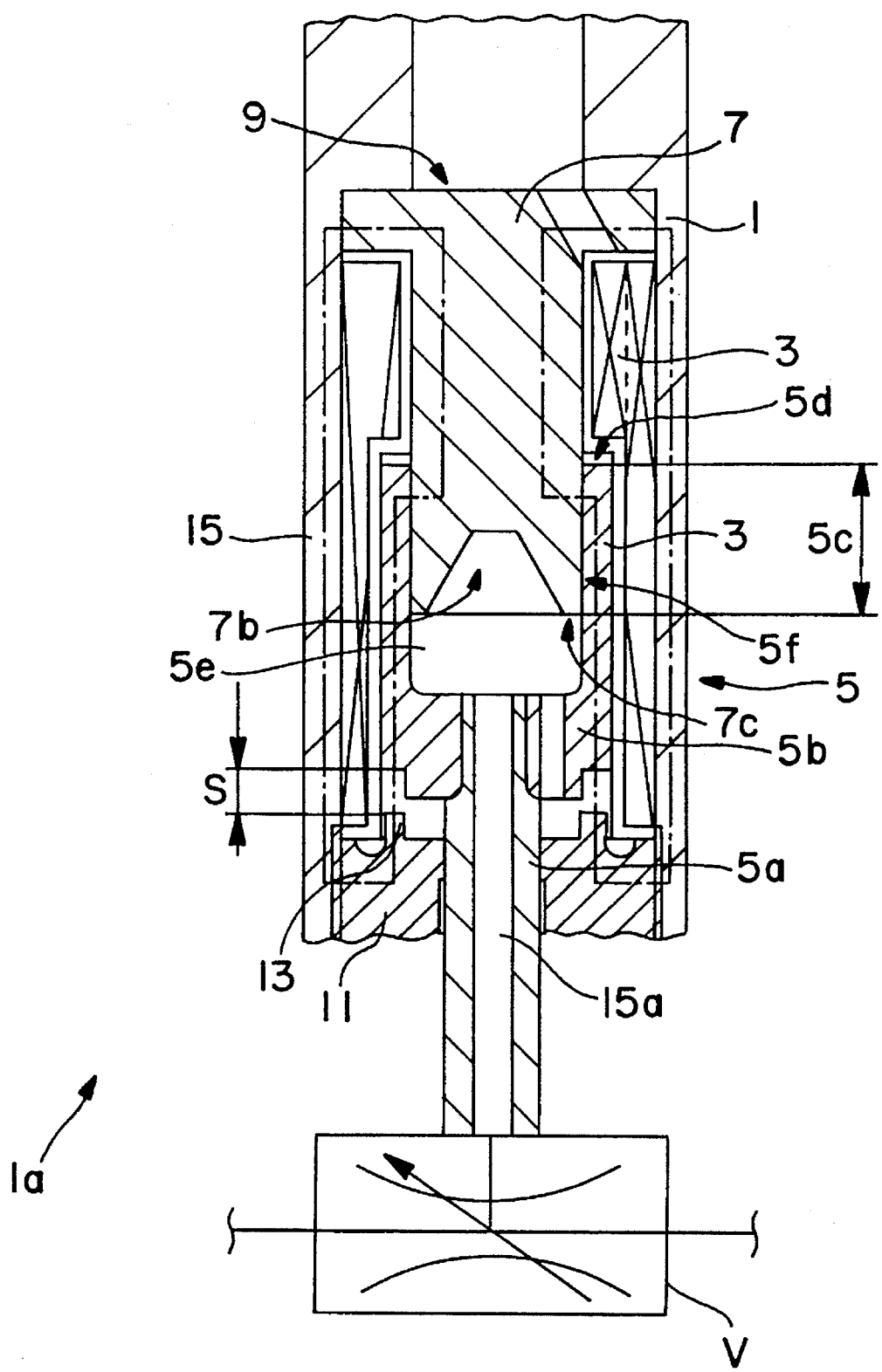
FIG. 1a shows a valve actuation device with a coaxial armature orientation.
Figure 1B:
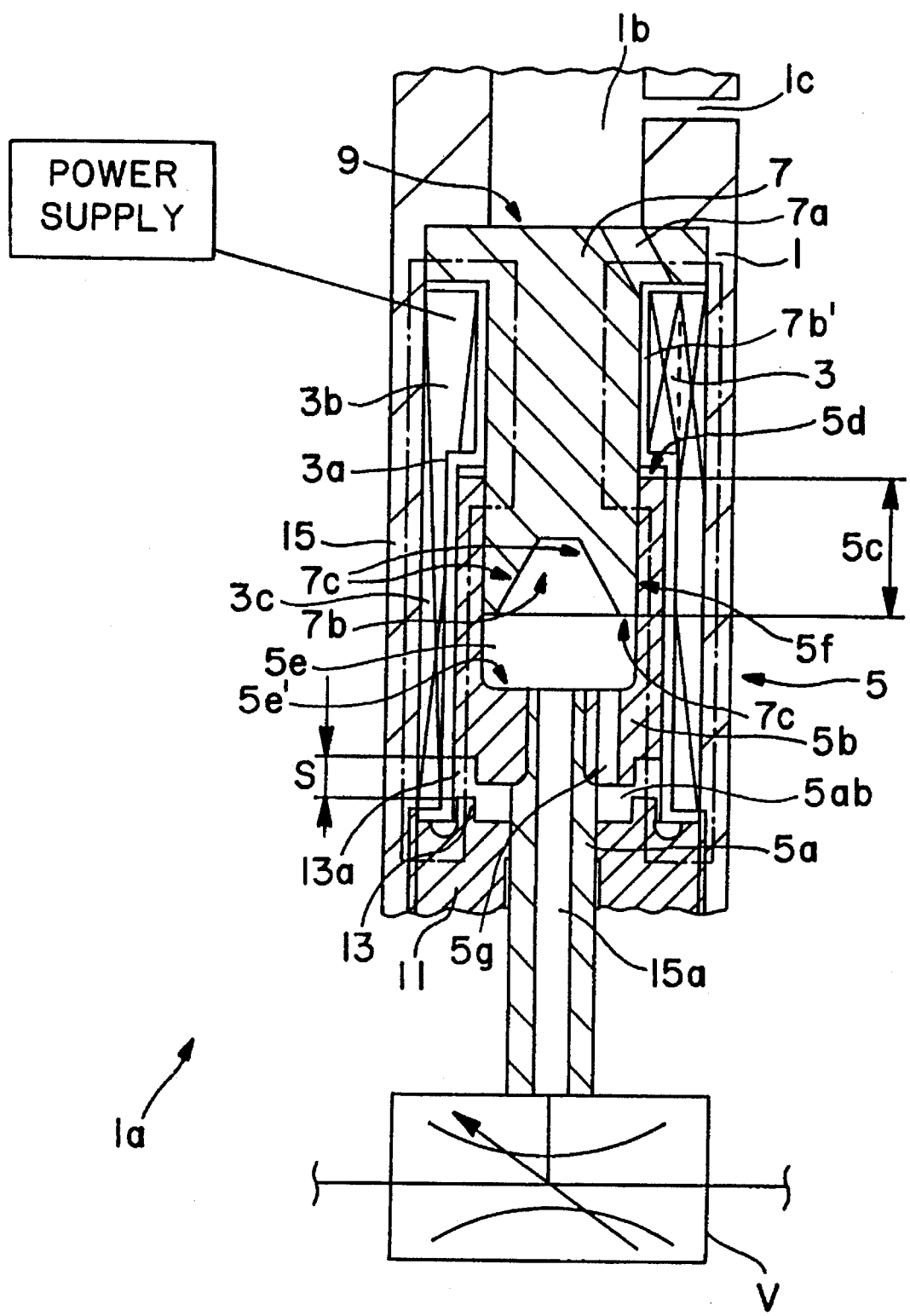
FIG. 1b shows substantially the same view as FIG. 1a, but shows additional components.

FIGS. 1a and 1b show a valve actuation device 1a, which valve actuation device 1a can generally include a housing 1. In accordance with one embodiment of the present invention, the valve actuation device can preferably be incorporated into the vibration damper shown in FIG. 1. In the housing 1, there can preferably be a coil form 3, which coil form 3, together with an axially movable armature 5, can preferably form an actuator. The armature 5 can preferably be oriented coaxially with the coil form 3. The valve actuation device 1a can also preferably comprise a coil core 7. The coil core 7 preferably has an essentially T-shaped cross section, so that the coil core 7 can serve as a cover 9 for the housing and/or the coil form 3. On an opposite end of the valve actuation device 1a, there can preferably be a closing body 11, which closing body 11 can have a guide 13 for the armature 5.

The armature 5 can preferably be designed in two parts, a first part 5b disposed substantially within the housing 1, and a second guide part 5a extending out of the housing 1 to a valve V. The part 5b of the armature 5 can be made of magnetizable materials, and the guide part 5a can be made of non-magnetizable materials such as plastic, brass or austenitic steels. The part 5b of the armature 5 can preferably have an axial overlap 5c with the coil core 7. In accordance with one embodiment of the present invention shown in FIG. 1a, the guide 13 can preferably be configured to engage with a recess 13a of the armature part 5b.

For purposes of explanation, the magnetic flux which produces the axial movement of the armature 5 is indicated by dotted lines in the figures. Thus, a tubular segment 15 preferably of the housing 1, the cover 9, the coil core 7, the armature 5b and the closing body 11 can preferably form a series of magnetic return bodies. Essentially the only significant gap in the series is an actuation distance s. In accordance with one embodiment of the present invention, the actuation distance s can preferably represent the distance which the armature 5 can travel in the axial direction.

The valve actuation device 1a can preferably have a series of structural measures, which structural measures can optimize the magnetic flux. One such structural measure is a stepped design of the coil form 3, whereby the armature part 5b can preferably be located inside the largest diameter of the coil form 3. In accordance with one embodiment of the invention shown in FIG. 1b, the coil form 3 can preferably have a step 3a, which step 3a can be located between an upper portion 3b of the coil form 3 and a lower portion 3c of the coil form 3, wherein the lower portion 3c preferably has a greater inside diameter than upper portion 3b and preferably surrounds armature part 5b. Further, as also shown in FIG. 1b, the coil form 3 can be charged by a power supply. The stepped part 3a (see FIG. 1b) of the coil form 3, on one hand, can insulate the cover 9 from an upper end surface 5d of the armature 5b, and, as a result of the larger volume of the coil form 3 preferably at upper portion 3b (see FIG. 1b), can make possible a greater induction. The step 3a (see FIG. 1b) can preferably be constructed by means of a suitable winding process, or also by the use of two windings which are located inside one another. Such winding processes are generally well known and will not be discussed further here.

The coil core 7 can preferably have a recess 7b possibly in the shape of a cone as shown thereby creating end surfaces 7c, whereby the end surface 7c of the coil core 7 can thus be relatively small, preferably to form a contact or transition resistance to the base surface 5e' (see FIG. 1b) of chamber 5e of the armature 5. In addition, the coil core 7 can simultaneously have a relatively large overlap 5c with the armature 5 for the lowest possible contact resistance in the radial direction. In accordance with one embodiment of the present invention shown in FIG. 1b, the recess 7b of the coil core 7 can preferably have sloped portions 7c, which sloped portions 7c can preferably be sloped radially outwardly towards the tubular segment 15 of the housing 1.

To prevent freezing or sticking effects between the parts of the actuation device 1a which move with respect to one another, which effects can result in an essentially uncontrollable hysteresis caused by friction, there can preferably be a small air gap 5f between the armature part 5b and the coil core 7. In accordance with one embodiment of the present invention, hysteresis can occur due to the friction between the coil core 7 and the armature part 5b, wherein the magnetic properties of part 5b and/or the coil core 7 may not return to their original state or value when the external field is reduced. The guiding of the armature results between the base part 11 and the armature part 5a.

In accordance with at least one preferred embodiment of the present invention, the valve actuation device 1a shown in FIGS. 1a and 1b, and in FIGS. 2, 2a, 3 and 3b discussed further below, can preferably be incorporated into a vibration damper inside an existing structure of the vibration damper. Such an existing structure could be a hollow piston rod of a vibration damper, an outer tube of a vibration damper, an inner tube of a vibration damper, or a side tube of a vibration damper. Thus, the preferably magnetic or magnetisable piston rod, outer tube, inner tube, or side tube can preferably comprise the housing 1, and can preferably serve as a return body for the primary or main magnetic flux. Therefore, the need for a separate return body can essentially be eliminated. This can be a distinct advantage, since return bodies can typically be bulky and can therefore occupy a relatively large space.

Further, the valve actuation device 1a of the present invention can, in accordance with one embodiment, be of a relatively compact size in that the coil form 3 can preferably be longer than known coil assemblies. Thus, for example, the valve actuation device 1a can preferably be inserted into a hollow piston rod, without having to enlarge the diameter of the piston rod.

In accordance with at least one embodiment of the present invention shown in FIG. 1b, there can preferably be a flow of damping fluid or damping medium through a passage 1b within the housing 1. The passage 1b can lead to an upper work chamber (not shown here) of a vibration damper, possibly by means of an orifice 1c located essentially laterally in the housing 1. Alternatively, the passage 1b could itself lead to the upper work chamber and thus the need for an orifice 1c could essentially be eliminated. The flow of damping fluid can then preferably enter an additional passage 7a of the coil core 7, which passage 7a can preferably lead to yet an additional passage 7b'. Passage 7b' can preferably be disposed adjacent the coil form 3 and, in accordance with one embodiment, the flow in passage 7b' can serve to cool the coil form 3. From passage 7b', the flow can then enter a space 5ab, which space 5ab preferably surrounds a portion of armature part 5a. From space 5ab, the flow can enter an additional passage 5g in armature part 5b, and can then flow into a flow connection 15a in guide part 5a. The flow in flow connection 15a can eventually enter into a lower work chamber (not shown here) of the vibration damper. Of course, the flow of damping medium can also flow in the opposite direction from that described immediately hereinabove, i.e. from the lower work chamber to the upper work chamber.

In accordance with at least one embodiment of the present invention, the letter "V" can preferably be considered to represent a valve which can be actuated by the valve actuation device 1a of the present invention. The valve V could be located in a piston (not shown here) of a vibration damper. The valve V could be a unidirectional valve, or possibly a multidirectional valve. Such piston valves are generally well known and will not be discussed in any great detail herein.

In accordance with an alternative embodiment of the present invention, the reference numeral 7b' can preferably represent a solid part which can serve to seal the coil form 3. Thus, the flow of damping medium can preferably essentially only flow in space 5ab, passage 5g, chamber 5e and flow connection 15a. In accordance with this particular embodiment, guide part 5a of the armature 5 can preferably form a valve seat at the lower end thereof. An illustration of this type of configuration can be seen in FIG. 1c, discussed further below, as indicated by the dotted lines, which dotted lines can be considered to represent guide part 5a of armature 5. Thus, the actuating device 1a can preferably act as a valve V' (see FIG. 1c) by the axial movement of the part 5a upwards and downwards. In accordance with this alternative embodiment, a lateral passage similar to passage 1c discussed above could preferably be disposed in housing 1 (or tubular segment 15), which passage could preferably lead to the upper working chamber of the vibration damper. The guide part 5a can then preferably ultimately lead to the lower working chamber of the vibration damper and can preferably bypass the valve V shown in FIG. 1b. A further explanation of the functioning of this type of valve configuration can be found in U.S. Pat. No. 4,723,640 to Beck on Feb. 9, 1988, entitled "Adjustable Hydraulic Vibration Damper".

Figure 1C:
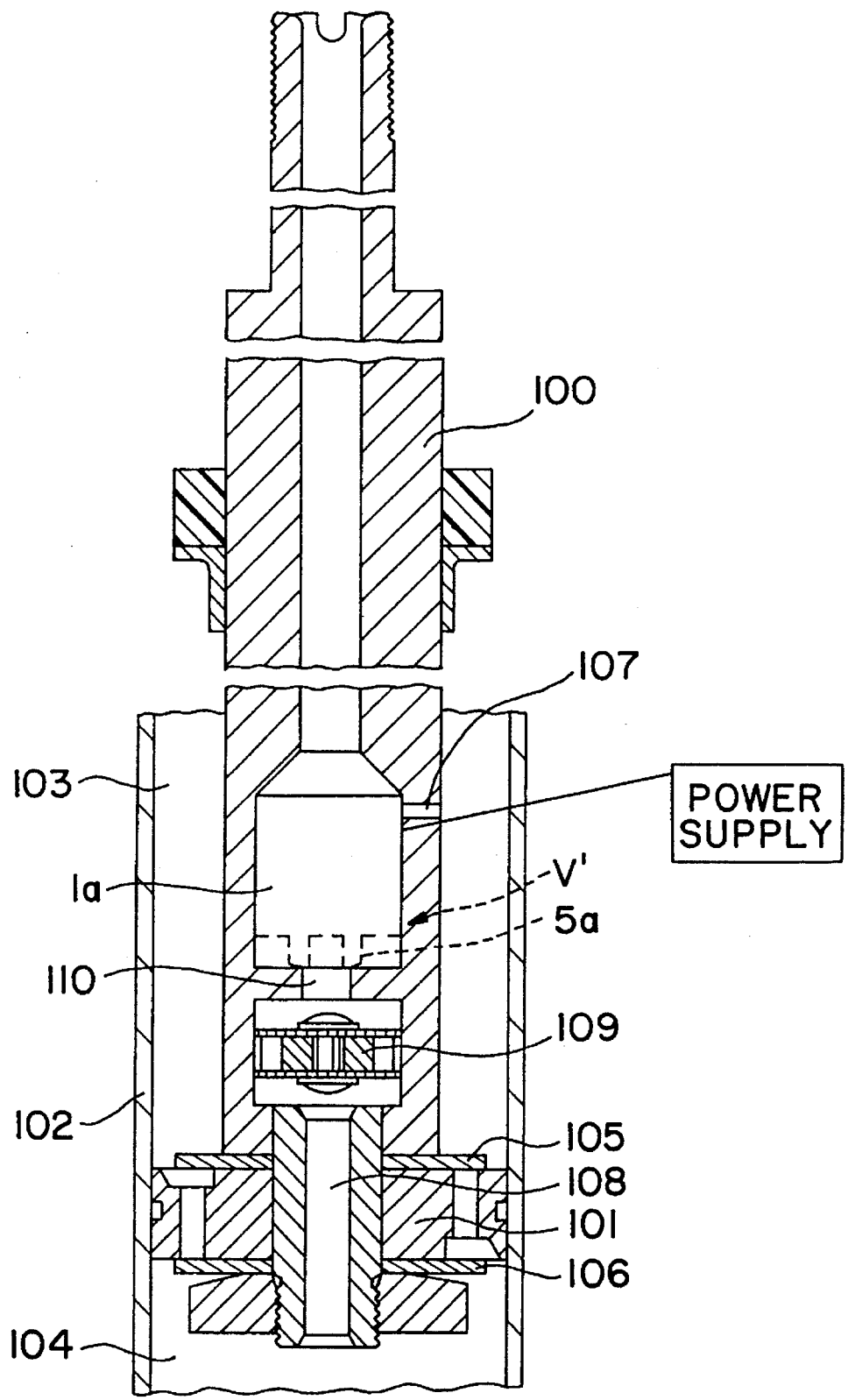
FIG. 1c shows a valve actuation device located inside of a hollow piston rod of a vibration damper.

FIG. 1c shows one embodiment of the present invention in which the valve actuation device 1a has been incorporated into a preferably hollow piston rod 100. It should be understood that the valve actuation device 1a is shown schematically only in FIG. 1c, and that the vibration damper shown in FIG. 1c is presented only by way of example of one possible application of the present invention. The piston rod 100 can preferably have a piston 101 attached thereto, which piston 101 divides a work cylinder 102 into an upper work chamber 103 and a lower work chamber 104. The piston 101 can preferably be equipped with valves 105, 106, preferably for the production of damping force for damping fluid flow between chambers 103 and 104.

In accordance with this particular embodiment shown in FIG. 1c, the upper chamber 103 can also be connected to the lower chamber 104 by a fluid bypass around piston 101, which bypass can preferably be formed by a transverse bore 107 and a longitudinal bore 108. The transverse bore 107 can preferably lead to the upper chamber 103, and the longitudinal bore can preferably lead to the lower chamber 104. There can also preferably be a bypass valve 109 disposed adjacent the valve actuator 1a, and a passage 110 which can preferably be pressurized by guide part 5a of the present invention.

Figure 1G:
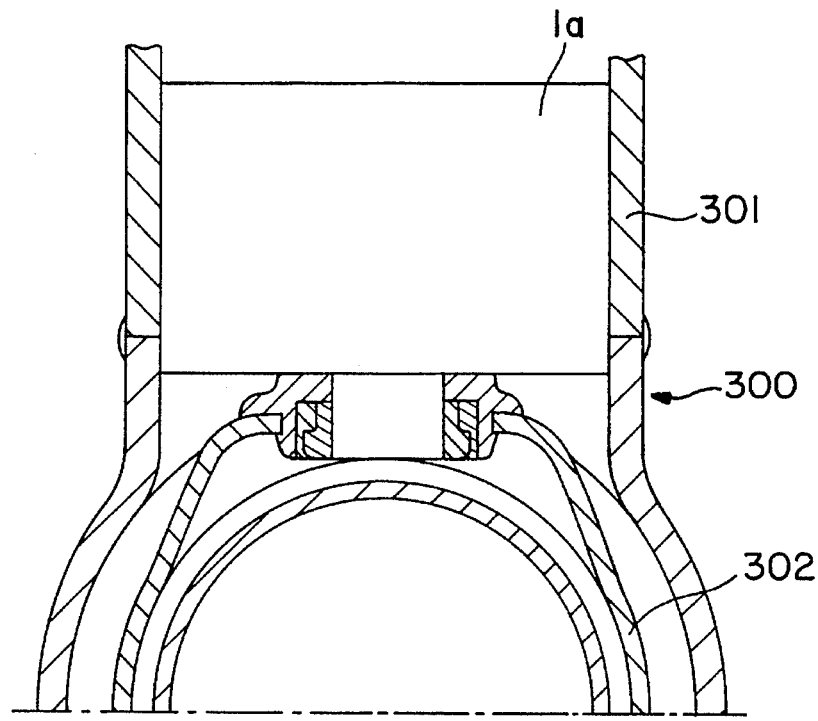
FIG. 1g shows a valve actuation device located in a side tube of a vibration damper.
Figure 1H:
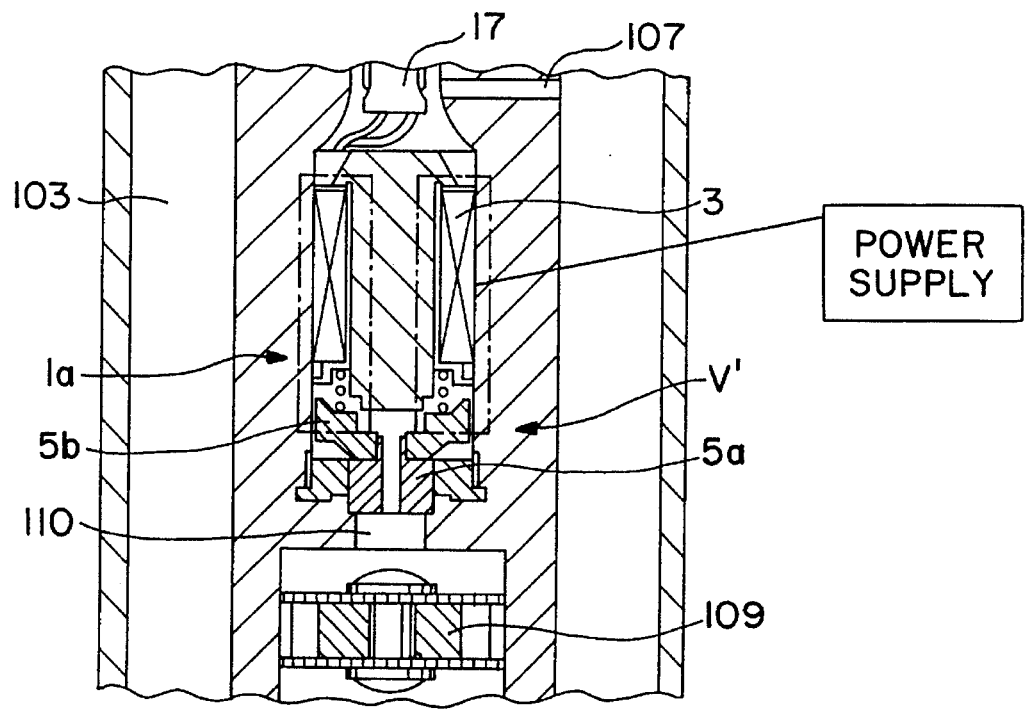
FIG. 1h shows a more detailed depiction than that shown in FIG. 1c of the valve actuation device inside a hollow piston rod of a vibration damper.

A more detailed depiction than that shown in FIG. 1c of the actuator 1a inside a piston rod is shown in FIG. 1h.

In accordance with yet an additional embodiment of the present invention, the valve actuation device 1a shown in FIGS. 1a, 1b, and in FIGS. 2, 2a, 3 and 3a discussed further below, can preferably serve to actuate the valve V disposed adjacent the actuator 1a. For example, the guide part 5a can preferably move axially upwards and downwards with respect to the coil core 7 and can serve to open and close the valve V. Thus, the guide part 5a can preferably operate as a control pin such as that disclosed in U.S. Pat. No. 5,078,240 to Ackermann entitled "Adjustable Vibration Damper With Valve Body in Piston Having Direction Flow Control".

FIGS. 1d, 1e and 1f show an additional embodiment of the present invention in which the valve actuator 1a could be incorporated. In accordance with this particular embodiment, the valve actuator 1a can preferably be located near the top end of a vibration damper or shock absorber as shown in FIG. 1d. Of course, the valve actuator 1a of the present invention could conceivably be utilized in virtually any area of a vibration damper within an existing structure. It should be noted that the vibration damper shown in FIGS. 1d, 1e and 1f is presented only by way of example of an additional possible application of the present invention, and that components discussed immediately herebelow should be considered to be interchangeable with similar components discussed with respect to FIGS. 1a, 1b, 2, 2e, 3 and 3a. It should also be noted that the vibration damper shown in FIGS. 1d, 1e, and 1f is a multi-tube vibration damper, and that the valve actuator 1a of the present invention is located in an inner tube of the vibration damper. Alternatively, the valve actuator 1a could conceivably be located within the outer tube of the vibration damper.

The level regulation apparatus (vibration damper or shock absorber) for motor vehicles depicted in FIG. 1d comprises the work cylinder 1' in which a piston 2' slides on the end of a hollow piston rod 3'. The work cylinder 1' is closed on one end by a member 4' and on the other end by another member 5', through which the piston rod 3' exits in a sealed manner. In a manner not shown, the bottom member 4' can be fastened or affixed by means of a fastener 6' on the body of the vehicle and the piston rod 3' can be fastened by means of a fastener 7' on another portion of the vehicle; e.g., on the axle of the vehicle. The work cylinder 1' is surrounded by a ring-shaped or annular compensation chamber filled partly with oil and partly with gas. It is divided by a partition 8' into a high pressure chamber 9', 11' and a low pressure chamber 10'. The high pressure chamber 9', 11' is divided by a diaphragm 12' into a damping medium chamber and a gas chamber, respectively.

In the low pressure chamber 10', the damping medium and the low pressure gas cushion 13' are in surface contact. The surface 14' between the damping medium and the gas cushion is indicated by a dashed line. When not pumped up, the same pressure prevails in the low pressure chamber 10' and in the high pressure chamber 9', 11'.

The dampening medium in the high pressure chamber 9', 11' is connected via the hole 32' and the circulation passage 17' leading into the flow connection 25' and the check valve 26' and into the work chamber 16'. From the work chamber 16', the damping medium flows only in one direction via the check valves 15' in the work piston 2' into the work chamber 18'. The flow travels from the work chamber 18' through the hole 33' and into the passage 24' and then to the valve actuator 1a (shown schematically only). There can preferably be a valve body 30' associated with the valve actuator 1a, which valve body 30' can be sealed against the valve seat 29'. The valve actuator 1a of the present invention can preferably act on the valve body 30' to permit fluid flow through passage 25'. If the flow connection 25' is open, the dampening medium flows either via the passage 17 to the high pressure chamber 9', 11' or if the piston 2' is extended, the dampening medium flows through the check valve 26' into the work chamber 16'. Depending on the activation of the actuator 1a, a softer or harder damping force is achievable.

For level control, in a hole 28' in the base body 27', a pump rod 19' is held in a rigid and sealed manner which forms an oil pump together with a control tube 34' located in the cavity of the piston rod 3' and acting as a pump cylinder 21'. The movements of the vehicle visa vis the road surface and of the piston rod 3' fastened to it, caused by uneven spots, activate the oil pump, which constantly transports oil, controlled by the suction valve 22' from the low pressure chamber 10' via the pressure valve 23' through a hole 36' (see FIGS. 1d and 1e) into the intermediate chamber or annulus 35' and then into the work cylinder 1'. The work piston 2' and the piston rod 3' with the control tube 34' are thereby pushed until a deregulation opening in the pump rod 19' makes a connection between the work chamber 16' under high pressure and via the hollow pump rod 19' with the low pressure chamber 10'. The deregulation function is thereby initiated.

The passage or conduit 24' and the circulation passage 17' are located so that they run outside the work cylinder 1' in the low pressure chamber 10' and the high pressure chamber 9', 11', respectively. FIG. 1e is a cross section of the work cylinder 1', wherein the passage 24' and the circulation passage 17' are rigidly connected with the work cylinder 1' and sealed. This connection can be made, for example, in the form of a soldered connection.

In FIG. 1f, concentrically around the work cylinder 1', there is a tube 31', which forms the conduit 24' and the conduit 17'. The conduits are separated from one another by means of gaskets 36'. The shape of the passage 24', the circulation passage 17' and the grooves used to hold the gaskets can thereby be achieved by non-cutting shaping or forming.

FIG. 1g shows an additional embodiment of a vibration damper in the vicinity of a side tube 301, which side tube 301 can typically be attached to an outer tube 300 of a vibration damper. As shown in FIG. 1g, the valve actuator 1a of the present invention can preferably be disposed within the side tube 301, and can preferably utilize the side tube 301 as a magnetic return body for the primary or main magnetic flux. In accordance with this particular embodiment, the outer tube 300 can preferably be extruded outwardly and the side tube 301 can be welded or otherwise appropriately fastened to the outer tube 301. The valve actuation device 1a of the present invention, in accordance with one embodiment, can preferably serve to regulate flow between the outer tube 300 and an inner tube 302 of the vibration damper.

Alternatively, the outer tube 300 could conceivably be extruded further than that shown in FIG. 1g, and the valve actuator 1a can be disposed within the outer tube 300, thereby possibly eliminating the need for the side tube 301. It should be understood that the valve actuator 1a is shown schematically only for purposes of simplicity.

FIGS. 2, 2a, 3 and 3a illustrate different variants of the present invention. In the valve actuator devices 1a shown in these figures, the housing 1 can preferably be a component of the magnetic return body, and the coil form 3 can be arranged in series with the armature 5. It should be noted that in FIGS. 3 and 3a, the armature 5 can preferably be represented by the reference number 5a, since in these embodiments the armature 5 is preferably made of one piece.

Figure 2:
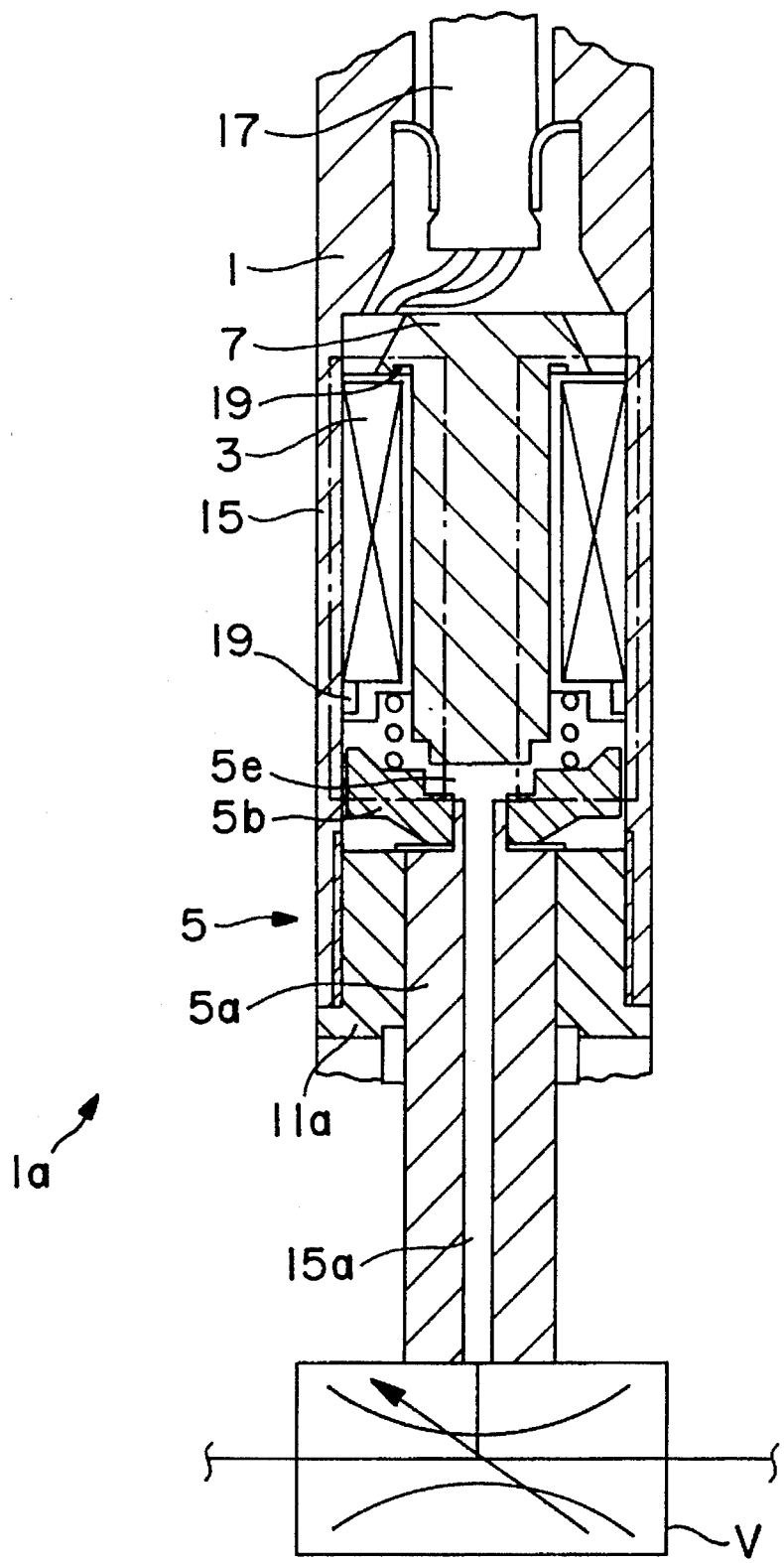
FIG. 2 shows a valve actuation device with the armature and coil form arranged in series.
Figure 2A:
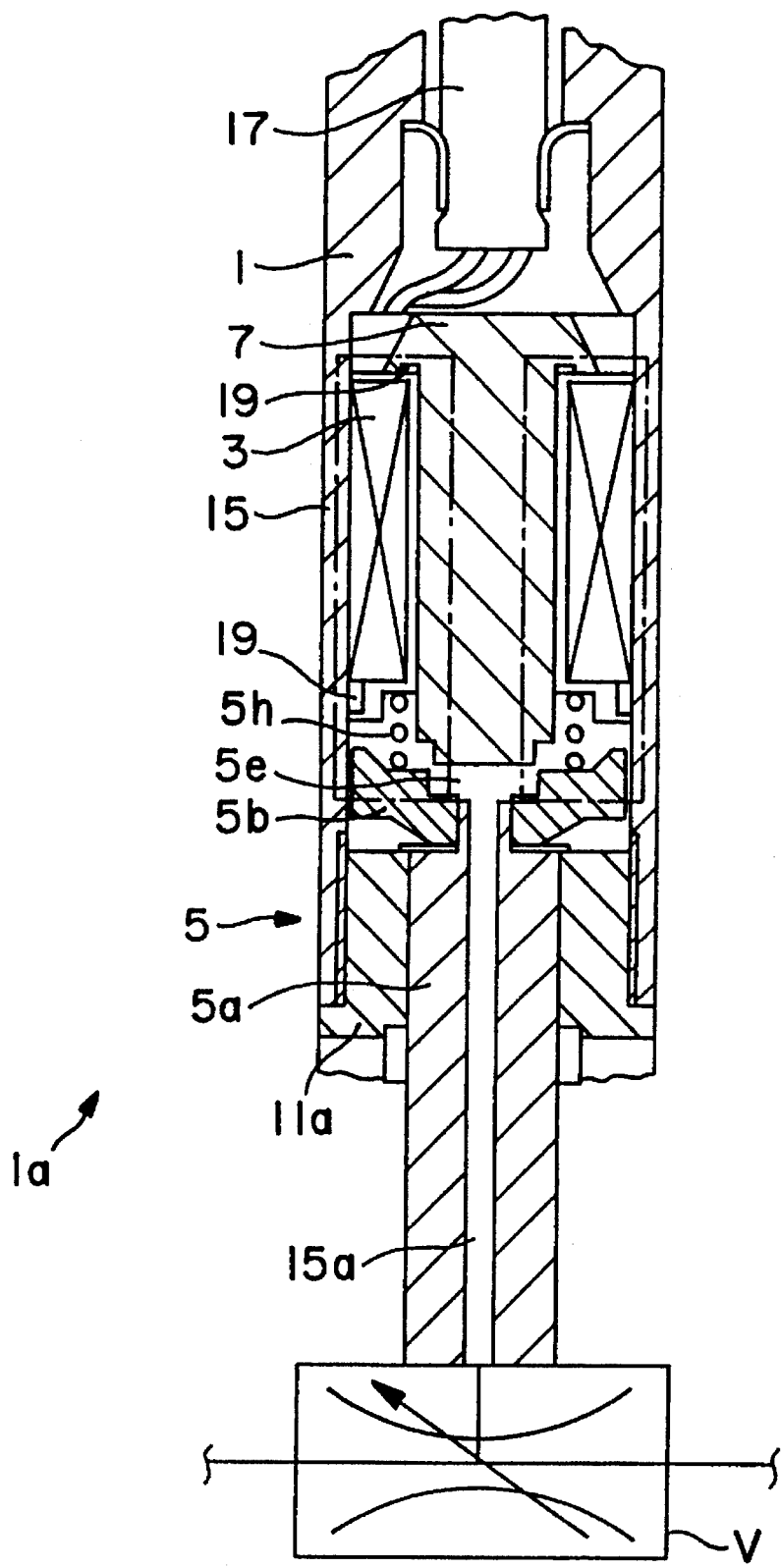
FIG. 2a shows substantially the same view as FIG. 2, but shows additional components.

In accordance with the embodiments shown in FIGS. 2 and 2a, the armature can preferably be designed in two parts 5a, 5b, similar to the embodiments shown in FIGS. 1a and 1b. The closure body 11a and/or the armature part 5a, must be made of non-magnetizable material, to prevent the sticking effects described above. The magnetic flux can preferably spill over radially from the tubular housing segment 15 to the armature part 5b, and can preferably be propagated in the coil core 7. Inside the armature 5, there can preferably be a flow connection 15a, which flow connection 15a can preferably lead to a pressure equalization chamber 5e. So that the hydraulic medium preferably does not reach the reverse side of the coil form 3, there can preferably be at least one sealing insert 19, which sealing insert 19 can be located at an arbitrary point between the pressure equalization chamber 5e and a cable connection 17 for the power supply to the coil form 3. It can thus become possible to essentially guarantee that no hydraulic medium will escape from the valve actuation device 1a.

In accordance with one preferred embodiment shown in FIG. 2a, there can preferably be a spring 5h which can serve to bias the armature 5 away from the coil core 7 until the coil form 3 is charged. Further, the flow of damping medium can, in accordance with one embodiment, flow from an upper work chamber of a vibration damper to equalisation chamber 5e, possibly by means of a lateral passage (not shown here) in the tubular housing segment 15, and then through flow connection 15a to a lower work chamber of the vibration damper.

Figure 3:
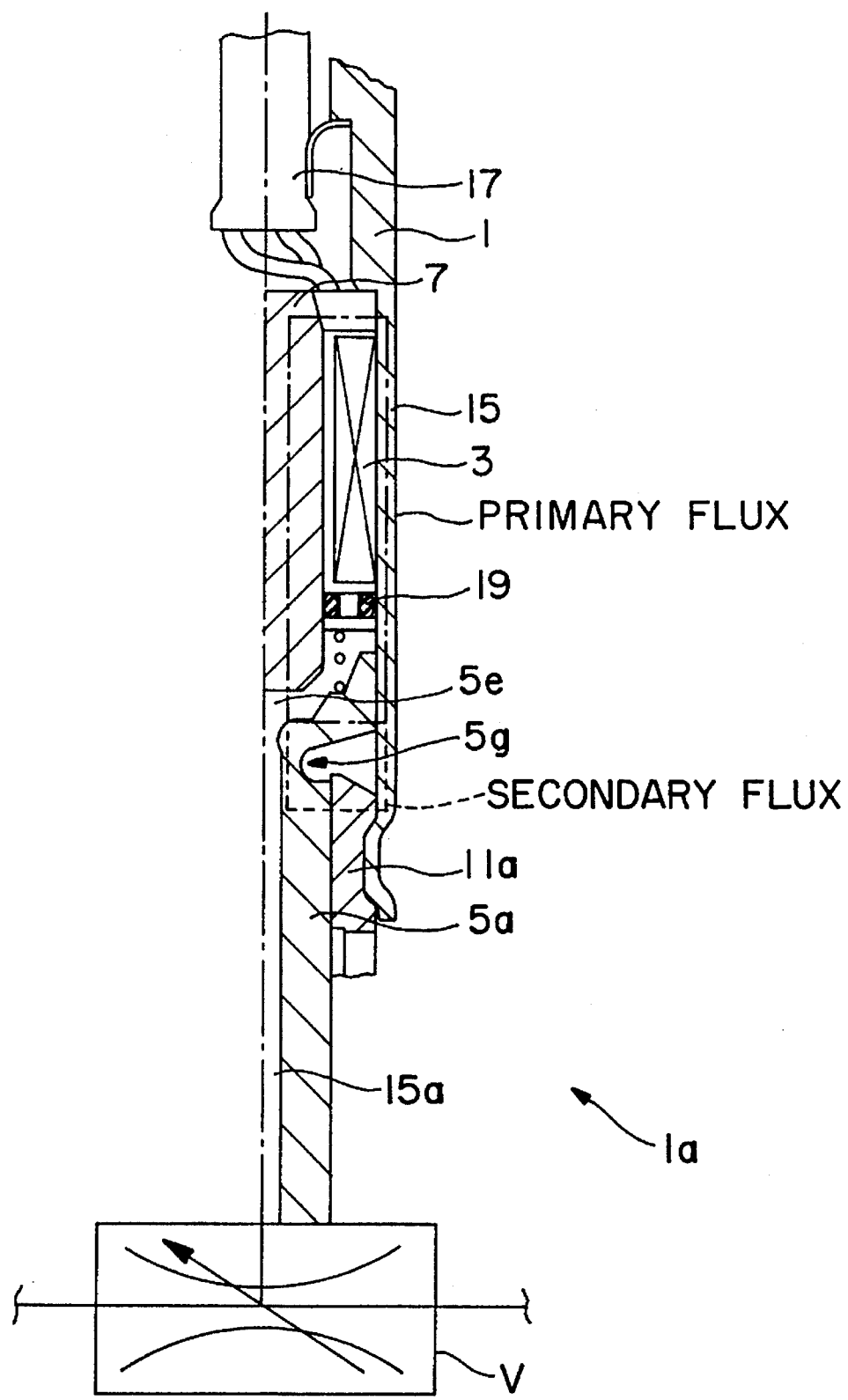
FIG. 3 shows a valve actuation device with the armature and coil form arranged in series.
Figure 3A:
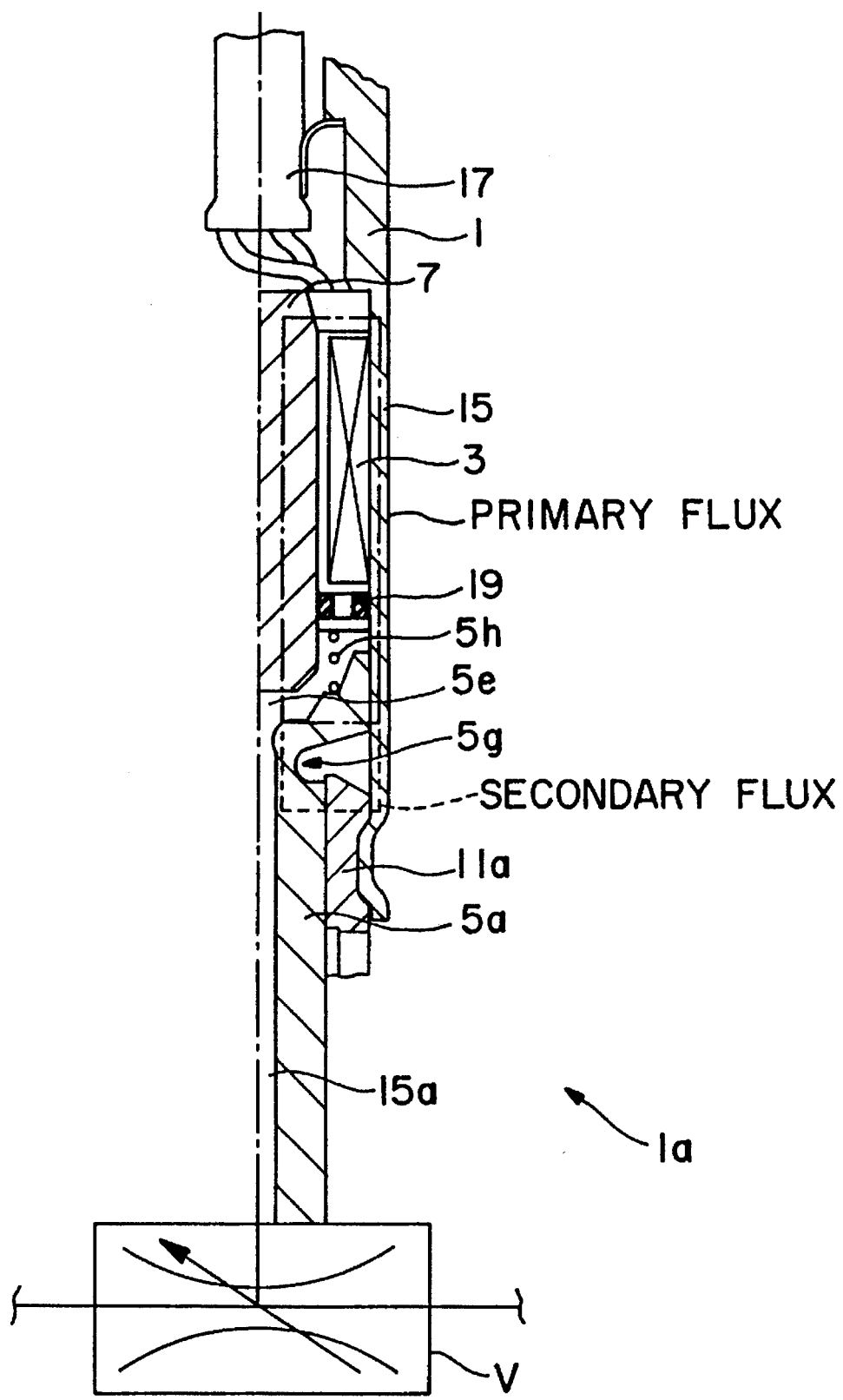
FIG. 3a shows substantially the same view as FIG. 3, but shows additional components.

In accordance with the embodiments shown in FIGS. 3 and 3a, the armature 5 can preferably be made in one piece 5a. Once again, to avoid the sticking effects, the armature 5 can preferably have a portion 5g with a reduced cross section, which represents a contact resistance for the magnetic flux, so that a primary flux can preferably be achieved radially via the housing to the armature 5. If the closing body or base 11a is also made of magnetizable material, a secondary magnetic flux can be created. The secondary magnetic flux, which secondary magnetic flux is shown by dotted lines, can preferably be insignificant, as compared to the primary magnetic flux, on account of the portion 5g having the reduced cross section. The figures also show that the closure body or base 11a can be screwed on, welded on or crimped on. There can also be a spring 5h (see FIG. 3a), in accordance with one embodiment of the present invention, which can serve to bias the armature 5 away from the coil core 7, until the coil form 3 is charged.

It should be understood that the embodiments shown in FIGS. 2, 2a, 3 and 3a can conceivably be utilized in the vibration dampers or shock absorbers shown in FIGS. 1, 1c, 1d, and 1g discussed further above. The flow of damping medium can preferably flow in a similar manner as that discussed hereinabove with respect to FIGS. 2 and 2a.

The illustrated valve actuation devices 1a are suitable in particular for use as adjustable valves in a vibration damper. It has been discovered that the space required is so small that the valve actuation device 1a can even be installed inside a hollow piston rod, whereby there is essentially no need to enlarge the diameter of the piston rod.

Further, in accordance with one embodiment of the present invention, the housing 1, which housing 1 can preferably be a part of an existing structure of a vibration damper, can preferably form part of the primary or main magnetic flow path. Further, at least a portion of the housing 1 can preferably be disposed immediately adjacent the gap or actuation distance s.

One feature of the invention resides broadly in a vibration damper for damping vibrations of a suspension of a motor vehicle, the vibration damper comprising: a cylinder defining a chamber therein, the cylinder containing a damping fluid; a piston rod sealingly projecting into the cylinder and being axially displaceable within the cylinder; the piston rod having a longitudinal axis and defining a longitudinal direction parallel to the longitudinal axis; a piston being attached to the piston rod, the piston being slidably disposed within the cylinder to sealingly divide the chamber into first and second chambers; apparatus for permitting fluid communication between the first chamber and the second chamber; a first end and a second end; the cylinder being disposed between the first end and the second end; the first end comprising first apparatus for connecting the vibration damper to a body of a motor vehicle; the second end comprising second apparatus for connecting the vibration damper to a suspension of a motor vehicle; valve apparatus for regulating flow of damping fluid through the apparatus for permitting fluid communication; valve actuation apparatus for opening and closing the valve apparatus; the valve actuation apparatus comprising: an armature, the armature being axially movable between a first position for opening the valve apparatus to permit damping fluid to flow therethrough, and a second position for closing the valve apparatus to prevent damping fluid from flowing therethrough; coil apparatus for generating a magnetic flux to move the armature; a magnetic flux path comprising apparatus for leading a substantial portion of a magnetic flux generated by the coil apparatus; the piston rod comprising a housing disposed adjacent the coil apparatus, at least a substantial portion of the housing comprising a substantial portion of the magnetic flux path.

Another feature of the invention resides broadly in the vibration damper wherein the valve actuation apparatus further comprises apparatus for guiding the armature during movement of the armature between the first position and the second position, at least a portion of the apparatus for guiding being disposed outside of the magnetic flux path.

Another feature of the invention resides broadly in the valve actuation device, in particular for a vibration damper, comprising a housing in which, by means of a controllable coil form, an armature executes an actuation movement, whereby the coil form has a coil core, characterized by the fact that at least one segment of the housing 1 represents a magnetic return body for the magnetic flux.

Another feature of the invention resides broadly in the valve actuation device characterized by the fact that the guide 13 of the armature 5 lies outside the primary magnetic flux.

Yet another feature of the invention resides broadly in the valve actuation device characterized by the fact that inside the guide 13 of the armature 5, at least a portion 5a, 11 is made of a material with a low magnetic conductivity.

Still another feature of the invention resides broadly in the valve actuation device characterized by the fact that the armature 5 has a segment with a reduced cross section 5g, which divides the magnetic flux into a primary flux and at least one secondary flux.

A further feature of the invention resides broadly in the valve actuation device characterized by the fact that the armature 5 is oriented coaxially with the coil form 3.

Another feature of the invention resides broadly in the valve actuation device characterized by the fact that the coil form 3 has a stepped contour.

Yet another feature of the invention resides broadly in the valve actuation device characterized by the fact that the armature 5 has an axial overlap 5c with the coil core 7.

Still another feature of the invention resides broadly in the valve actuation device characterized by the fact that the coil core 7 has a recess 7b in the direction of the armature 5.

A further feature of the invention resides broadly in the valve actuation device characterized by the fact that the coil form 7 has a minimum length which is comprised of the length of the portion of the armature in the primary magnetic flux and the travel of the armature 5.

Another feature of the invention resides broadly in the valve actuation device characterized by the fact that the armature 5b has a flow connection 15 for the pressure equalization chamber 5e, whereby there is a sealing insert 19 located at an arbitrary point between the pressure equalization chamber 5e and a cable connection for the coil body.

Yet another feature of the invention resides broadly in the valve actuation system characterized by the fact that the coil core 7 has a cross section which is essentially T-shaped.

Still another feature of the invention resides broadly in the valve actuation device characterized by the fact that the hollow piston rod of the vibration damper has the housing segment 1.

Types of vibration dampers or shock absorbers having electromagnetic valves which can incorporate or be utilized in accordance with the present invention may be disclosed in the following U.S. Pat. No. 4,723,640 to Beck on Feb. 9, 1988, entitled "Adjustably Hydraulic Vibration Damper"; U.S. Pat. No. 5,265,703 to Ackermann on Nov. 30, 1993, entitled "Adjustable Hydraulic Vibration Damper for Motor Vehicles"; U.S. Pat. No. 5,335,757 to Knecht et al. on Aug. 9, 1994, entitled "Hydraulic Adjustable Vibration Damper"; U.S. Pat. No. 5,078,240 to Ackermannn et al. on Jan. 7, 1992, entitled "Valve Body in Piston Having Directional Flow Control" and U.S. Pat. No. 4,635,765 to Schmidt on Jan. 13, 1987, entitled "Adjustable Hydraulic Damper Apparatus."

Types of vibration dampers or shock absorbers which may incorporate the present invention may be disclosed in the following U.S. Pat. No. 4,993,693 to Löhr et al. on Feb. 19, 1991, entitled "Self-pumping Hydropneumatic Shock Absorbing Leg With Internal Level Regulation"; U.S. Pat. No. 4,986,393 to Preukschat et al. on Jan. 22, 1991; U.S. Pat. No. 4,749,070 to Moser et al. on Jun. 7, 1988; and U.S. Pat. No. 4,723,640 to Beck on Feb. 9, 1988.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 01 065.6, filed on Jan. 15, 1994, having inventors Andreas Förster and Alfred Wirth, and DE-OS P 44 01 065.6 and DE-PS P 44 01 065.6, as well as their published equivalents, which published on or about Sep. 15, 1995, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for damping vibrations of a suspension of a motor vehicle, said vibration damper comprising:

a cylinder defining a chamber therein, said cylinder containing a damping fluid;

a piston rod sealingly projecting into said cylinder and being axially displaceable within said cylinder;

said piston rod having a longitudinal axis and defining a longitudinal direction parallel to the longitudinal axis;

a piston being attached to said piston rod, said piston being slidably disposed within said cylinder to sealingly divide said chamber into first and second chambers;

means for permitting fluid communication between said first chamber and said second chamber;

a first end and a second end;

said cylinder being disposed between said first end and said second end;

said first end comprising first means for connecting said vibration damper to a body of a motor vehicle;

said second end comprising second means for connecting said vibration damper to a suspension of a motor vehicle;

valve means for regulating flow of damping fluid through said means for permitting fluid communication;

valve actuation means for opening and closing said valve means;

said valve actuation means comprising:
      an armature, said armature being axially movable between a first position for opening said valve means to permit damping fluid to flow therethrough, and a second position for closing said valve means to prevent damping fluid from flowing therethrough;
      coil means for generating a magnetic flux immediately adjacent said coil means, to move said armature;
      a magnetic flux path comprising means for leading a substantial portion of a magnetic flux generated by said coil means;

said piston rod comprising a housing disposed adjacent said coil means, at least a substantial portion of said housing comprising a substantial portion of said magnetic flux path;

said valve actuation means further comprising means for guiding said armature during movement of said armature between said first position and said second position, a substantial portion of said guiding means being disposed outside of said magnetic flux path.

2. The vibration damper according to claim 1 wherein all of said guiding means is disposed outside of said magnetic flux path.

3. The vibration damper according to claim 2 wherein:

said armature comprises a first part and a second part, said first part being disposed adjacent said coil means and said second part being disposed adjacent said valve means;

said first part comprises a portion comprising magnetizable material, said portion comprising magnetizable material comprising a portion of said magnetic flux path;

said second part comprises a portion comprising non-magnetizable material; and said guiding means comprises a closing body disposed both coaxially about said second part of said armature and outside of said magnetic flux path, said closing body comprising a non-magnetizable material.

4. The vibration damper according to claim 3 wherein:

a gap is defined between said coil core and said first part of said armature, said gap comprising an actuation distance defined between said first position of said armature and said second position of said armature; and said at least a substantial portion of said housing of said piston rod is disposed adjacent said gap.

5. The vibration damper according to claim 4 wherein said housing of said piston rod defines an interior portion of said piston rod and an exterior portion of said piston rod, said valve actuation means being disposed within said interior portion of said piston rod.

6. The vibration damper according to claim 5 wherein said coil means comprises:

a coil form having means for being connected to a power supply; and a coil core disposed substantially coaxially within said coil form, said coil core comprising a substantially T-shaped cross-section taken along the longitudinal axis.

7. The vibration damper according to claim 6 wherein:

said second part of said armature comprises an orifice disposed within said second part;

said valve actuation means further comprises:

a chamber disposed between said coil core and said first part of said armature, said chamber being in fluid communication with said orifice of said second part; and means for sealing disposed between said chamber and said means for connecting said coil form to a power supply, said sealing means for preventing damping fluid from contacting said means for connecting.

8. The vibration damper according to claim 7 wherein:

said valve actuation means further comprises:

means for biasing said armature away from said coil core;

said coil core has a first end and a second end, said first end of said coil core being disposed adjacent said means for connecting said coil form to a power supply, and said second end being disposed adjacent said first part of said armature;

said first end of said coil core has an outer diameter and said second end of said coil core has an outer diameter, said outer diameter of said second end of said coil core being substantially less than said outer diameter of said first end of said coil core; and said coil core comprises a portion of said magnetic flux path.

9. A method of assembling and operating a vibration damper for damping vibrations of a suspension of a motor vehicle, said method of assembling comprising the steps of:

providing a cylinder, the cylinder defining a chamber therein, said cylinder containing a damping fluid;

providing a piston rod sealingly projecting into said cylinder and being axially displaceable within said cylinder;

providing a piston attached to said piston rod, said piston being slidably disposed within said cylinder to sealingly divide said chamber into first and second chambers;

providing means for permitting fluid communication between said first chamber and said second chamber;

providing first means for connecting said vibration damper to a body of a motor vehicle;

providing second means for connecting said vibration damper to a suspension of a motor vehicle;

providing valve means for regulating flow of damping fluid through said means for permitting fluid communication;

providing valve actuation means for opening and closing said valve means;

providing an armature movable between a first position and a second position;

providing coil means for generating a magnetic flux to move said armature;

providing a magnetic flux path comprising means for leading a substantial portion of a magnetic flux generated by said coil means;

providing said piston rod with a housing disposed adjacent said coil means;

providing means for guiding said armature between said first position and said second position, a substantial portion of said guiding means being disposed outside of said magnetic flux path;

said method of operating comprising the steps of:

connecting said first end of said vibration damper to a body of a motor vehicle;

connecting said second end of said vibration damper to a suspension of a motor vehicle;

axially displacing said piston rod within said cylinder and sliding said piston within said cylinder;

permitting fluid communication between said first chamber and said second chamber, with said means for permitting;

regulating flow of damping fluid through said means for permitting fluid communication;

generating a magnetic flux immediately adjacent said coil means, with said coil means, and forming a magnetic flux path for leading magnetic flux;

leading a substantial portion of a magnetic flux path through a substantial portion of said housing of said piston rod;

moving said armature between said first position and said second position; and guiding said armature outside of said magnetic flux path during said step of moving, with said substantial portion of said guiding means.

10. The method according to claim 9 wherein said method of assembling further comprises disposing all of said guiding means outside of said magnetic flux path.

11. The method according to claim 10 wherein:

said step of providing said armature further comprises providing a first part and a second part, said first part being disposed adjacent said coil means and said second part being disposed adjacent said valve means;

said step of providing said first part further comprises providing a portion comprising magnetizable material, said portion comprising magnetizable material comprising a portion of said magnetic flux path;

said method of operating further comprises the step of leading a portion of said magnetic flux path through said portion of said first part comprising magnetizable material;

said step of providing said second part further comprises providing a portion comprising non-magnetizable material; and said step of providing said guiding means further further comprises providing a closing body disposed both coaxially about said second part of said armature, and outside of said magnetic flux paths said closing body comprising a non-magnetizable material.

12. The method according to claim 11 wherein said method of assembling further comprises:

defining a gap between said coil core and said first part of said armature, said gap comprising an actuation distance defined between said first position of said armature and said second position of said armature; and disposing said at least a substantial portion of said housing of said piston rod adjacent said gap.

13. The method according to claim 12 wherein:

said housing of said piston rod defines an interior portion of said piston rod and an exterior portion of said piston rod;

said method of assembling further comprises disposing said valve actuation means within said interior portion of said piston rod;

said step of providing said coil means further comprises:

providing a coil form having means for being connected to a power supply; and providing a coil core disposed substantially coaxially within said coil form, said coil core comprising a substantially T-shaped cross-section taken along the longitudinal axis; and said method further comprises the step of connecting said coil form to a power supply.

14. The method according to claim 13 wherein:

said step of providing said second part of said armature further comprises providing an orifice disposed within said second part;

said step of providing said valve actuation means further comprises:

providing a chamber disposed between said coil core and said first part of said armature, said chamber being in fluid communication with said orifice of said second part; and providing means for sealing disposed between said chamber and said means for connecting said coil form to a power supply, said sealing means for preventing damping fluid from contacting said means for connecting; said method of operating further comprising the steps of:

communicating fluid between said chamber and said orifice; and preventing damping fluid from contacting said means for connecting with said sealing means.

15. The method according to claim 14 wherein:

said step of providing said valve actuation means further comprises:

providing means for biasing said armature away from said coil core;

said method of assembling further comprising the step of biasing said armature away from said coil core;

said step of providing said coil core further comprises providing said coil core with a first end and a second end, said first end of said coil core being disposed adjacent said means for connecting said coil form to a power supply, and said second end being disposed adjacent said first part of said armature;

said first end of said coil core has an outer diameter and said second end of said coil core has an outer diameter, said outer diameter of said second end of said coil core being substantially less than said outer diameter of said first end of said coil core; and said method of operating further comprising the step of leading a portion of said magnetic flux path through said coil core.

\* \* \* \* \*

UNITED STATES PATENT AND TRADEMARK OFFICE
CERTIFICATE OF CORRECTION

PATENT NO.   : 5,551,540
DATED        : September 3, 1996
INVENTOR(S)  : Andreas FÖRSTER and Alfred WIRTH Page 1 of 10

It is certified that error appears in the above-indentified patent and that said Letters Patent is hereby corrected as shown below:

In column 2, line 2, after 'a', delete "primary-flux" and insert --primary flux--.

In column 7, line 7, before 'piston', delete "magnetisable" and insert --magnetizable--.

In column 9, line 50, after 'vehicle', delete "visa vis" and insert --vis a vis--.

In column 10, line 65, after 'to', delete "equalisation" and insert --equalization--.

In column 14, line 61, Claim 6, after 'form', delete "having-means" and insert --having means--.

In column 16, line 46, Claim 11, after 'flux', delete "paths" and insert --path,--.

In column 9, line 5, after 'cylinder', delete " 1' " and insert --401--.

In column 9, line 5, after 'piston', delete " 2' " and insert --402--.

In column 9, line 6, after 'rod', delete " 3'. " and insert --403.--.

In column 9, line 6, after 'cylinder', delete " 1' " and insert --401--.

UNITED STATES PATENT AND TRADEMARK OFFICE
CERTIFICATE OF CORRECTION

PATENT NO.  : 5,551,540
DATED       : September 3, 1996
INVENTOR(S) : Andreas FÖRSTER and Alfred WIRTH It is certified that error appears in the above-indentified patent and that said Letters Patent is hereby corrected as shown below:

In column 9, line 7, after the first occurrence of 'member', delete " 4' " and insert --404--.

In column 9, line 8, before ' through', delete " 5', " and insert --405,--.

In column 9, line 8, after 'rod', delete " 3' " and insert --403--.

In column 9, line 9, after 'member', delete " 4' " and insert --404--.

In column 9, line 10, after 'fastener', delete " 6' " and insert --406--.

In column 9, line 11, after 'rod', delete " 3' " and insert --403--.

In column 9, line 12, after 'fastener', delete " 7' " and insert --407--.

In column 9, line 13, after 'cylinder', delete " 1' " and insert --401--.

In column 9, line 15, after 'partition', delete " 8' " and insert --408--.

In column 9, line 16, after the first occurrence of 'chamber', delete " 9', 11' " and insert --409, 411--.

UNITED STATES PATENT AND TRADEMARK OFFICE
CERTIFICATE OF CORRECTION

PATENT NO. : 5,551,540
DATED : September 3, 1996
INVENTOR(S) : Andreas FÖRSTER and Alfred WIRTH Page 3 of 10

It is certified that error appears in the above-indentified patent and that said Letters Patent is hereby corrected as shown below:

In column 9, line 17, before 'The', delete " 10'. " and insert --410.--.

In column 9, line 17, after 'chamber', delete " 9', 11' " and insert --409, 411--.

In column 9, line 18, after 'diaphragm', delete " 12' " and insert --412--.

In column 9, line 20, after 'chamber', delete " 10' " and insert --410--.

In column 9, line 21, after 'cushion', delete " 13' " and insert --413--.

In column 9, line 22, before 'between', delete " 14' " and insert --414--.

In column 9, line 24, after 'chamber', delete " 10' " and insert --410--.

In column 9, line 25, after 'chamber', delete " 9', 11'. " and insert --409, 411.--.

In column 9, line 26, after 'chamber, delete " 9', " and insert --409,--.

In column 9, line 27, before 'is', delete " 11' " and insert --411--.

UNITED STATES PATENT AND TRADEMARK OFFICE
CERTIFICATE OF CORRECTION

PATENT NO. : 5,551,540
DATED : September 3, 1996
INVENTOR(S) : Andreas FÖRSTER and Alfred WIRTH It is certified that error appears in the above-indentified patent and that said Letters Patent is hereby corrected as shown below:

In column 9, line 27, after 'hole', delete " 32' " and insert --432--.

In column 9, line 28, before 'leading', delete " 17' " and insert --417--.

In column 9, line 28, after 'connection', delete " 25' " and insert --425--.

In column 9, line 29, before 'and', delete " 26' " and insert --426--.

In column 9, line 29, after the first occurrence of 'chamber', delete " 16'. " and insert --416.--.

In column 9, line 30, before the first occurrence of 'the', delete " 16', " and insert --416,--.

In column 9, line 31, after 'valves', delete " 15' " and insert --415--.

In column 9, line 31, after 'piston', delete " 2' " and insert --402--.

In column 9, line 32, before the first occurrence of 'The', delete " 18'. " and insert --418.--.

In column 9, line 32, after 'chamber', delete " 18' " and insert --418--.

UNITED STATES PATENT AND TRADEMARK OFFICE
CERTIFICATE OF CORRECTION

PATENT NO. : 5,551,540  
DATED : September 3, 1996  
INVENTOR(S) : Andreas FÖRSTER and Alfred WIRTH Page 5 of 10

It is certified that error appears in the above-indentified patent and that said Letters Patent is hereby corrected as shown below:

In column 9, line 33, after 'hole', delete " 33' " and insert --433--.

In column 9, line 33, after 'passage', delete " 24' " and insert --424--.

In column 9, line 35, after 'body', delete " 30' " and insert --430--.

In column 9, line 36, after 'body', delete " 30' " and insert --430--.

In column 9, line 37, before the first occurrence of 'The', delete " 29'. " and insert --429.--.

In column 9, line 38, after 'body', delete " 30' " and insert --430--.

In column 9, line 39, after 'passage', delete " 25'. " and insert --425.--.

In column 9, line 39, after 'connection', delete " 25' " and insert --425--.

In column 9, line 40, after 'passage', delete "17" and insert --417--.

In column 9, line 41, after 'chamber', delete " 9', 11' " and insert --409, 411--.

UNITED STATES PATENT AND TRADEMARK OFFICE
CERTIFICATE OF CORRECTION

PATENT NO. : 5,551,540

DATED : September 3, 1996

INVENTOR(S) : Andreas FÖRSTER and Alfred WIRTH

It is certified that error appears in the above-indentified patent and that said Letters Patent is hereby corrected as shown below:

In column 9, line 41, after 'piston', delete " 2' " and insert --402--.

In column 9, line 42, after 'valve', delete " 26' " and insert --426--.

In column 9, line 43, after 'chamber', delete " 16' " and insert --416--.

In column 9, line 46, after 'hole', delete " 28' " and insert --428--.

In column 9, line 46, after 'body', delete " 27' " and insert --427--.

In column 9, line 47, after 'rod', delete " 19' " and insert --419--.

In column 9, line 48, after 'tube', delete " 34' " and insert --434--.

In column 9, line 49, after 'rod', delete " 3' " and insert --403--.

In column 9, line 50, after 'cylinder', delete " 21". " and insert --421.--.

In column 9, line 51, after 'rod', delete " 3' " and insert --403--.

UNITED STATES PATENT AND TRADEMARK OFFICE
CERTIFICATE OF CORRECTION

PATENT NO. : 5,551,540   Page 7 of 10
DATED : September 3, 1996
INVENTOR(S) : Andreas FÖRSTER and Alfred WIRTH It is certified that error appears in the above-indentified patent and that said Letters Patent is hereby corrected as shown below:

In column 9, line 53, after 'valve', delete " 22' " and insert --422--.

In column 9, line 54, after 'chamber', delete " 10' " and insert --410--.

In column 9, line 54, after 'valve', delete " 23' " and insert --423--.

In column 9, line 55, after 'hole', delete " 36' " and insert --436--.

In column 9, line 56, after 'annulus', delete " 35' " and insert --435--.

In column 9, line 56, after 'cylinder', delete " 1' " and insert --401--.

In column 9, line 57, after the first occurrence of 'piston', delete " 2' " and insert --402--.

In column 9, line 57, after 'rod', delete " 3' " and insert --403--.

In column 9, line 57, after 'tube', delete " 34' " and insert --434--.

In column 9, line 59, before 'makes', delete " 19' " and insert --419--.

UNITED STATES PATENT AND TRADEMARK OFFICE
CERTIFICATE OF CORRECTION

PATENT NO. : 5,551,540
DATED : September 3, 1996
INVENTOR(S) : Andreas FÖRSTER and Alfred WIRTH It is certified that error appears in the above-indentified patent and that said Letters Patent is hereby corrected as shown below:

In column 9, line 59, after 'chamber', delete " 16' " and insert --416--.

In column 9, line 60, after 'rod', delete " 19' " and insert --419--.

In column 9, line 61, after 'chamber', delete " 10'. " and insert --410.--.

In column 9, line 63, after 'conduit', delete " 24' " and insert --424--.

In column 9, line 63, after the second occurrence of 'passage', delete " 17' " and insert --417--.

In column 9, line 64, after 'cylinder', delete " 1' " and insert --401--.

In column 9, line 65, after the first occurrence of 'chamber', delete " 10' " and insert --410--.

In column 9, line 66, before 'respectively.', delete " 9', 11', " and insert --409, 411,--.

In column 10, line 1, after 'cylinder', delete " 1', " and insert --401,--.

In column 10, line 1, after 'passage', delete " 24' " and insert --424--.

UNITED STATES PATENT AND TRADEMARK OFFICE
CERTIFICATE OF CORRECTION

PATENT NO. : 5,551,540
DATED : September 3, 1996
INVENTOR(S) : Andreas FÖRSTER and Alfred WIRTH It is certified that error appears in the above-indentified patent and that said Letters Patent is hereby corrected as shown below:

In column 10, line 2, after 'passage', delete " 17' " and insert --417--.

In column 10, line 2, after 'cylinder', delete " 1' " and insert --401--.

In column 10, line 5, after 'cylinder', delete " 1', " and insert --401,--.

In column 10, line 6, after 'tube', delete " 31', " and insert --431,--.

In column 10, line 6, after 'conduit', delete " 24' " and insert --424--.

In column 10, line 7, after 'conduit', delete " 17'. " and insert --417.--.

In column 10, line 8, after 'gaskets', delete " 36'. " and insert --436.--.

UNITED STATES PATENT AND TRADEMARK OFFICE
CERTIFICATE OF CORRECTION

PATENT NO. : 5,551,540
DATED : September 3, 1996
INVENTOR(S) : Andreas FÖRSTER and Alfred WIRTH It is certified that error appears in the above-indentified patent and that said Letters Patent is hereby corrected as shown below:

In column 10, line 8, after 'passage', delete " 24', " and insert --424,--.

In column 10, line 9, after 'passage', delete " 17' " and insert --417--.

Signed and Sealed this

Eighth Day of April, 1997

Attest:

BRUCE LEHMAN

Attesting Officer    Commissioner of Patents and Trademarks